UNITED STATES PATENT OFFICE.

JOHN McCALL, OF LONDON, AND BEVAN G. SLOPER, OF WALTHAMSTOW, ENGLAND, ASSIGNORS TO CHARLES J., WILLIAM J., AND CHARLES H. UNDERWOOD, OF BOSTON, MASSACHUSETTS.

IMPROVED METHOD OF PREPARING AND PRESERVING FOOD.

Specification forming part of Letters Patent No. 45,569, dated December 20, 1864.

*To all whom it may concern:*

Be it known that we, JOHN McCALL, of Houndsditch, in the city of London, England, merchant, and BEVAN GEORGE SLOPER, of Walthamstow, in the county of Essex, England, chemist, have invented Improvements in Preparing and Preserving Food; and we do hereby declare that the following is a full and exact description thereof.

Our improvements consist in the preparation of solid concentrated food-tablets, as hereinafter described.

We take meat, poultry, or game, desiccate it, and rasp or otherwise break it down into small fibers. We also take solid concentrated essence of meat and reduce it into small particles. We mix one or more of these ingredients with dried powdered vegetables and condiments in any desired proportions and subject them to strong pressure. After pressure we cover the tablets or cakes with a gelatinous or other protecting coating, and when dry the food is ready for the market. We prefer to inclose the tablets in tin-foil or paper.

To use the tabets they simply require boiling in water, in which they dissolve or become mixed and form a nourishing and palatable soup.

The above-described process obviates the necessity of the use of glass or other jars or metallic cans, and the article can thus be furnished at a less cost; and on account of its concentrated form and small bulk a soldier can carry with facility several days' rations.

What we claim as our invention, and desire to secure by Letters Patent, is—

The within-described concentrated food-tablets, prepared substantially in the manner set forth.

JOHN McCALL.
B. G. SLOPER.

Witnesses:
S. WILSON HOWARD,
137 *Houndsditch, N. E.*
JAMES HOROBIN,
*No.* 8 *St. Mary's Terrace, Shakespeare Road, Stoke, Newington.*